United States Patent [19]

Ishida

[11] Patent Number: 4,733,643
[45] Date of Patent: Mar. 29, 1988

[54] COMBUSTION CHAMBER ARRANGEMENT FOR AN INTERNAL COMBUSTION ENGINE

[75] Inventor: Shiro Ishida, Fujisawa, Japan

[73] Assignee: Isuzu Motors Limited, Tokyo, Japan

[21] Appl. No.: 935,450

[22] Filed: Nov. 26, 1986

[30] Foreign Application Priority Data

Nov. 30, 1985 [JP] Japan .................... 60-270287
Dec. 13, 1985 [JP] Japan .................... 60-278878

[51] Int. Cl.$^4$ ............................... F02B 19/10
[52] U.S. Cl. .................... 123/276; 123/298; 123/299; 239/533.4
[58] Field of Search ............. 123/263, 276, 279, 282, 123/285, 298, 299, 301, 305; 239/533.3, 533.4

[56] References Cited

U.S. PATENT DOCUMENTS

| 4,108,116 | 8/1978 | Ohta .................... 123/276 |
| 4,238,075 | 12/1980 | Bauder .................... 239/533.4 |
| 4,492,194 | 1/1985 | Chmela et al. .................... 123/276 |
| 4,528,951 | 7/1985 | Yamada .................... 239/533.4 X |
| 4,538,566 | 9/1985 | Tsuruoka .................... 123/276 |
| 4,546,739 | 10/1985 | Nakajima et al. .................... 123/299 |
| 4,635,597 | 1/1987 | Ohashi et al. .................... 123/276 |

FOREIGN PATENT DOCUMENTS 1526289  4/1970  Fed. Rep. of Germany ...... 123/276

Primary Examiner—Willis R. Wolfe, Jr.
Attorney, Agent, or Firm—Cullen, Sloman, Cantor, Grauer, Scott & Rutherford

[57] ABSTRACT

The invention provides a combustion chamber arrangement for an internal combustion engine which can attain stabilized firing performance and stabilized combustion performance during any load running of the engine. The combustion chamber arrangement includes a piston having a combustion chamber formed by recessing a top portion thereof along an axial direction, and a recessed portion formed by recessing a portion of a peripheral wall of the combustion chamber along the direction of the depth of the piston in a radially outward direction, whereby partially a rich mixture is produced within the recessed portion in order to improve the firing performance while mixture of a suitable concentration is dispersed and distributed within the combustion chamber so that the flame produced within the recessed portion may be propagated to the mixture within the combustion chamber.

12 Claims, 15 Drawing Figures

COMBUSTION CHAMBER ARRANGEMENT FOR AN INTERNAL COMBUSTION ENGINE

TECHNICAL FIELD

This invention relates to a combustion chamber arrangement for an internal combustion engine, and more particularly to a combustion chamber arrangement for an internal combustion engine wherein fuel of a low cetane number such as gasoline or alcohol can be used during running of the engine at any load.

BACKGROUND OF THE INVENTION

One type of internal combustion engine which includes a combustion chamber that generally has a high thermal efficiency and a low fuel consumption is a diesel engine of the direct injection type as disclosed, for example, in Japanese Utility Model Laid-Open No. 59-81775 and shown in FIGS. 14 and 15 of the drawings hereof.

The combustion chamber arrangement mentioned above includes a fuel injection nozzle b and a plurality of glow plugs m secured to a cylinder head a such that heating portions $m_1$ of the glow plugs m are accommodated in a combustion chamber f at the top i of a piston h when the piston h is positioned at the top dead center thereof as shown in FIG. 14.

The fuel injection nozzle b includes, as shown in FIG. 15, a nozzle body j forming an outer block and a needle valve c mounted for reciprocating movement within the nozzle body j. The nozzle body j has formed therein auxiliary nozzle holes e for atomizing and injecting fuel therethrough when the needle valve c is lifted an amount smaller than a predetermined lift value, and main nozzle holes e form atomizing and injecting fuel therethrough when the neddle valve c is lifted an amount greater than the predetermined lift value. The auxiliary nozzle holes d are formed in a direction such that atomized fuel may be injected therethrough toward the heating portions $m_1$ of the glow plugs m when the piston h is positioned at its top dead center. Meanwhile, the main nozzle holes are formed in a direction such that atomized fuel cannot be injected therethrough toward the heating portions $m_1$ of the glow plugs m when the piston h is positioned at its top dead center. It should also be noted that in the arrangement described above, a plurality of the glow plugs m are provided, and the main nozzle holes e and the auxiliary nozzle holes d are formed individually equal in number to the glow plugs m.

In the arrangement described above, fuel (light oil) is first atomized by and injected through the auxiliary nozzle holes and is ignited and burnt by the glow plugs, and then fuel (light oil) is atomized by and injected through the main nozzle holes and is ignited and burnt by propagation of flame thereto. Thus, the arrangement described above was intended to attain high combustion performance in terms of fuel costs, high output power and a reduction in ignition lag.

However, fuel which can be used in the diesel engine of the mentioned type is limited to light oil, and fuel having a low cetane number and a high volatility such as alcohol or gasoline cannot be used in the engine. This is because injected fuel is evaporated instantaneously due to the fact that the amount of fuel injected through the auxiliary nozzle holes upon low load running of the engine is small relative to the volume of the combustion chamber from the viewpoint of the construction of the fuel injection nozzle and that the volatility of the fuel is high.

Accordingly, under low engine load conditions, the concentration of air fuel mixture within the combustion chamber becomes excessively lean. Consequently, it is difficult to produce rich mixture around the glow plugs.

SUMMARY OF THE INVENTION

The present invention eliminates the problems described above.

It is an object of the invention to provide a combustion chamber arrangement for an internal combustion engine wherein volatile fuel having a low cetane number such as light oil, alcohol or gasoline can be burnt without misfiring in any load range, including starting of the engine.

In order to attain the object mentioned above, according to the present invention, a combustion chamber arrangement for an internal combustion engine is provided having the following construction.

A piston has a combustion chamber formed by recessing a top portion thereof along an axial direction. The piston further has a recessed portion formed by recessing a portion of a peripheral wall of the combustion chamber along a direction of the depth of the piston in a radially outward direction. A spark plug means is located such that a discharging portion thereof may be located within the recessed portion of the piston when the piston is moved to a position near the top dead center position thereof. A fuel injection nozzle means is located for atomizing and supplying fuel into the recessed portion and the combustion chamber.

In operation, a turning flow of air for combustion is supplied into the combustion chamber at the top of the piston. Within the combustion chamber, the turning flow makes a swirl flow which turns around the center axis of the combustion chamber. The swirl flow hardly enters the recessed portion due to its liquid inertia.

Meanwhile, fuel atomized by and supplied from the fuel injection nozzle means into the recessed portion is partially evaporated within the recessed portion by heat of compressed air and of a wall of the combustion chamber and is mixed with air within the recessed portion to produce mixture. Such mixture produced within the recessed portion is prevented from flowing out into the combustion chamber due to the presence of the swirl flow, and hence the concentration of the mixture within the recessed portion can be suitably adjusted. Accordingly, even where the fuel has high volatility, a rich mixture can be produced within the recessed portion. Consequently, stabilized firing and combustion can be effected within the recessed portion by the spark plug means.

On the other hand, fuel atomized and supplied into the combustion chamber is evaporated by heat of compressed air within the combustion chamber and also by the heat of the wall of the combustion chamber. The evaporated fuel is driven by the swirl flow and mixed with air within the combustion chamber. Consequently, mixture of a uniform concentration is dispersed and distributed within the combustion chamber. Accordingly, the mixture is burnt rapidly as a flame, and the energy of the flame produced within the recessed portion flows into the combustion chamber.

DESCRIPTION OF THE PREFERRED EMBODIMENTS

A first embodiment of the present invention will be described with reference to FIGS. 1 through 6.

Figure 1:
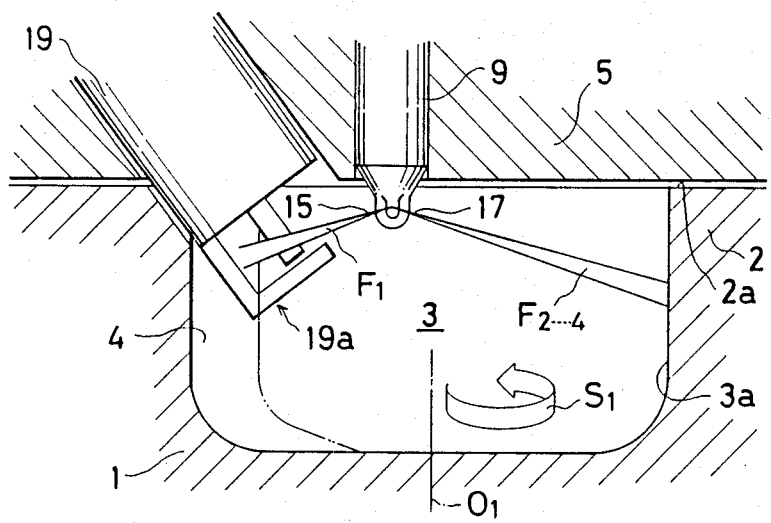
FIG. 1 is a partial vertical sectional view, in schematic representation, of an internal combustion engine showing a first embodiment of the present invention.
Figure 2:
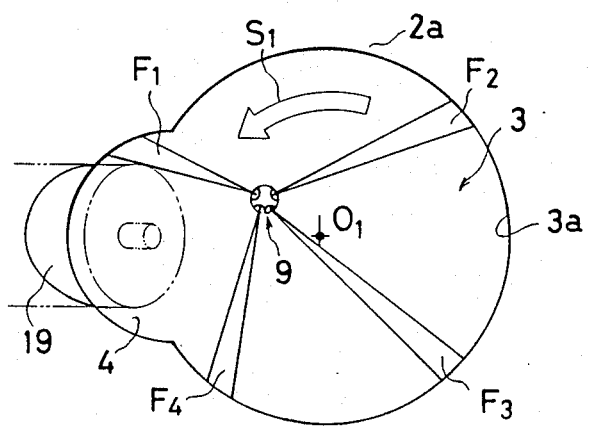
FIG. 2 is a diagrammatic plan view of the engine of FIG. 1.

Referring first to FIG. 1, reference numeral 1 denotes a piston, 2 a top portion of the piston 1, 3 a combustion chamber formed by deeply recessing the top portion 2 of the piston 1 downwardly in an axial direction from a reference plane provided by a top face 2a of the piston 1, and 5 a cylinder head.

A turning flow of suction air is supplied into the combustion chamber 3 through a swirl port, not shown. The combustion chamber 3 has a substantially circular section transverse relative to the axis of the piston 1, and thus such turning flow will make a swirl flow $S_1$ which turns along an inner peripheral wall 3a of the combustion chamber 3.

A combustion chamber arrangement for an internal combustion engine according to the present invention is advantageous in that it allows volatile fuel or fuel of a low cetane number, such as gasoline or alcohol, to be burnt well therein without causing misfiring even upon starting of the engine at a low temperature.

In order to attain this advantage, the combustion chamber 3, a fuel injection nozzle means for atomizing and supplying fuel into the combustion chamber 3 and a spark plug means for promoting firing are constructed and arranged as will now be described.

The peripheral wall 3a of the combustion chamber 3 is recessed, at a portion thereof along the direction of the depth thereof, arcuately in a radially outward direction to form a recessed portion 4 which does not allow a swirl flow $S_1$ to be readily admitted therein. In other words, the recessed portion 4 forms a radially outwardly convexed spacing relative to the combustion chamber 3, the transverse section of which is circular. A spark plug means 19 is received in and secured to the cylinder head 5 such that a discharging portion 19a thereof may be located in the recessed portion 4. A fuel injection nozzle means 9 employed in this embodiment of the invention has such a structure as seen in FIG. 3.

Figure 3:
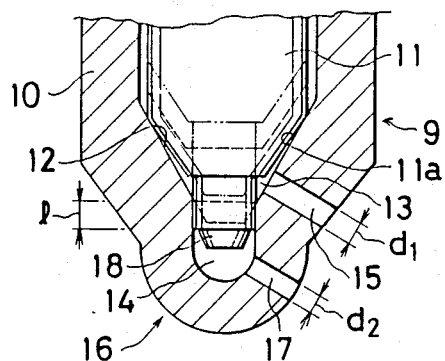
FIG. 3 is a partial sectional view, on an enlarged scale, of a fuel injection nozzle.

Referring to FIG. 3, the fuel injection nozzle means 9 includes a cylindrically shaped nozzle body 10 and a needle valve 11 received for reciprocating movement within the nozzle body 10. The nozzle body 10 has a valve seat 12 formed at a portion adjacent an end thereof and adapted to be seated by a seat portion 11a of the needle valve 11. The nozzle body 10 further has a fuel injection chamber 14 formed at a portion nearer to the end thereof than the valve seat 12. The fuel injection chamber 14 communicates with a fuel chamber (not shown) within the nozzle body 10 in response to opening of a throttle portion 13 at an end of the needle valve 11 when the seat portion 11a of the needle valve 11 is spaced from the valve seat 12 of the nozzle body 10. A single auxiliary nozzle hole 15 having a small diameter is open at the valve seat 12. A plurality of (3 in the present embodiment) main nozzle holes 17 are open in circumferentially spaced relationship from each other at an end portion 16 of the nozzle body 10 which defines the fuel injection chamber 14 therein. The main nozzle holes 17 have a greater diameter $d_2$ than the diameter $d_1$ of the auxiliary nozzle hole 15. Reference numeral 18 denotes a stem portion formed in a coaxial contiguous relationship to the end of the needle valve 11 such that it may allow only the auxiliary nozzle hole 15 to be opened until a predetermined lift value is reached by the needle valve 11. Thus, the length of the stem portion 18 is selected so as to provide a throttle interval in which only the auxiliary nozzle hole 15 is opened.

Accordingly, the fuel injection nozzle means 9 is formed as a nozzle of the Pintaux type wherein only the auxiliary nozzle hole 15 is opened while the needle valve 11 is lifted until the predetermined lift value is reached and then the main nozzle holes 17 are also opened while the needle valve 11 is lifted further than the predetermined lift value.

The fuel injection nozzle means 9 having a construction as described above is accommodated in and integrally secured to the cylinder head 5 as described hereinabove. In particular, the fuel injection nozzle means 9 is located substantially at a central position with respect to the combustion chamber 3. Further, the fuel injection nozzle means 9 is located such that when the piston 1 is near an end of a compression stroke (near the top dead center position) thereof, the main nozzle holes 17 thereof may face the opposing peripheral wall 3a of the combustion chamber 3 while the auxiliary nozzle hole 15 may face a portion of a swirl flow $S_1$ upstream of the discharging portion 19a of the spark plug means 19 in the recessed portion 4.

In other words, the main nozzle holes 17 are provided so as to spout atomized fuel in a plurality of directions into the combustion chamber 3 in order to attain uniform distribution of mixture of a uniform concentration within the combustion chamber 3 while the auxiliary nozzle hole 15 is provided so as to spout atomized fuel into the recessed portion 4 in order to produce mixture having a suitable higher concentration and a high firing performance within the recessed portion.

The operation of the above construction will now be described.

When the engine is in a very low speed operating area of the needle valve 11 upon starting or during low load running of the engine, the needle valve 11 of the fuel injection nozzle means 9 shown in FIG. 3 is moved in a lifting direction (in a direction to open the nozzle holes 15, 17) in response to a hydraulic pressure of fuel supplied into the nozzle body 10. Simultaneously with the lifting motion, the seat portion 11a of the needle valve 11 is spaced from the valve seat 12 to thereby open the auxiliary nozzle hole 17.

Figure 4:
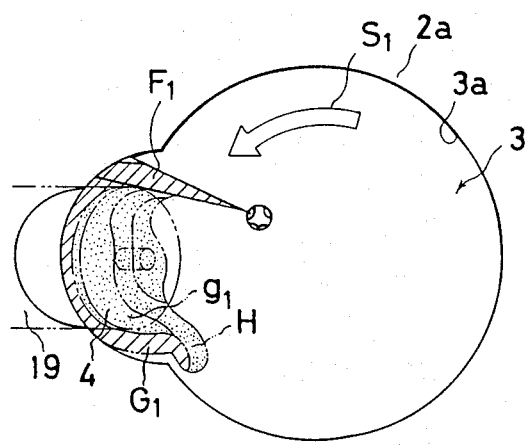
FIGS. 4 through 6 are diagrammatic representations illustrating burning conditions within a combustion chamber of the internal combustion engine of the first embodiment.
Figure 5:
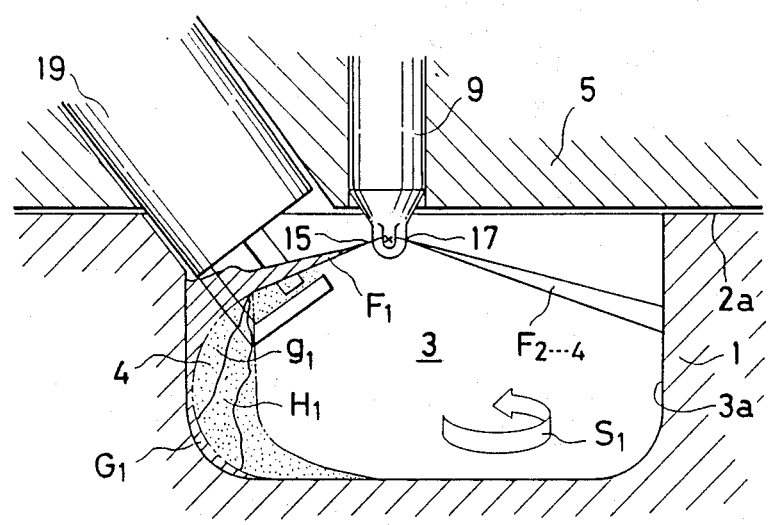

As the auxiliary nozzle hole 17 is opened, atomized fuel is supplied into the recessed portion 4 through the auxiliary nozzle hole 17 as shown in FIGS. 4 and 5. Atomized fuel F supplied from the auxiliary nozzle hole 17 advances partially across a swirl flow $S_1$ within the combustion chamber and thus collides with the portion of the inner peripheral wall 3a which defines the recessed portion 4. Such atomized fuel $F_1$ is further atomized by such collision and is thus scattered within the recessed portion 4.

Since the swirl flow $S_1$ hardly enters the recessed portion 4, the scattered atomized fuel $g_1$ is distributed in the recessed portion 4 and evaporated by heat of compressed air within the recessed portion 4 and also by heat of the wall of the combustion chamber 3 and is thus mixed with air. Meanwhile, the remaining part of the atomized fuel $F_1$ sticks to the peripheral wall 3a defining the recessed portion 4 to form a thin liquid film, that is, a fuel film $G_1$ which is gradually heated from outside and evaporated by heat of compressed air and of the wall of the combustion chamber 3.

Accordingly, steam from the fuel film $G_1$ and of the scattered atomized fuel $g_1$ is mixed with air within the recessed portion 4 so that a mixture layer $H_1$ is produced within the recessed portion 4. The mixture layer $H_1$ is prevented from flowing into the combustion chamber 3 due to the presence of the swirl flow $S_1$. Accordingly, where the fuel thus injected is gasoline or alcohol which has a low cetane number and a high volatility, the concentration of mixture within the recessed portion 4 can be raised.

Consequently, if discharging effected at the discharging portion 19a of the spark plug means 19 when such a rich mixture layer $H_1$ is produced, the mixture layer $H_1$ is fired rapidly and thus burnt. Such burning proceeds relatively rapidly and when a particular pressure is reached, burnt gas produced within the recessed portion 4 and unburnt fuel flow into the combustion chamber 3 and are mixed with air within the combustion chamber 3 so that they are burnt again. As a result, the quantity of NOx, HC and smoke can be maintained at a low level and combustion noises can be reduced.

Figure 6:
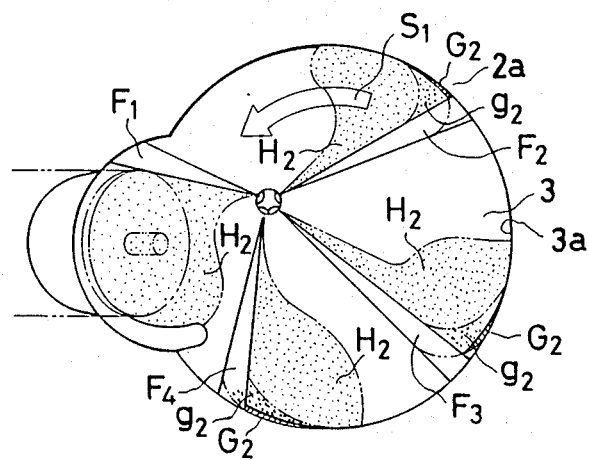

Meanwhile, during medium or high load running of the engine, the needle valve 11 of the fuel injection nozzle means 9 shown in FIG. 3 is lifted to a level higher than the predetermined lift value. Consequently, the plurality of main nozzle holes 17 are opened in addition to the auxiliary nozzle hole 15. Accordingly, atomized fuel is supplied from the main nozzle holes 17 toward portions of the peripheral wall 3a opposing to the main nozzle holes 17 as shown in FIGS. 5 and 6. Atomized fuel $F_2$, $F_3$, $F_4$ thus spouted from the main nozzle holes 17 advances across a swirl flow $S_1$ so that it is partially heated and evaporated by heat of compressed air. Meanwhile, the remaining parts of the atomized fuel $F_2$, $F_3$, $F_4$ spouted from the main nozzle holes 17 have a sufficient momentum to allow them to advance across the swirl flow $S_1$ to reach the peripheral wall 3a. Accordingly, the remaining parts of the atomized fuel $F_2$, $F_3$, $F_4$ collide with and are partially atomized further by the opposing peripheral wall 3a. Such further atomized parts of the atomized fuel $F_2$, $F_3$, $D_4$ are then evaporated by heat of compressed air and of the wall and are distributed within the combustion chamber 3. On the other hand, the remaining parts of the atomized fuel $F_2$, $F_3$, $F_4$ stick to respective portions of the peripheral wall 3a opposing to the main nozzle holes 17 due to collision with the peripheral wall 3a. Consequently, a thin fuel film $G_2$ is formed on each of the portions of the peripheral wall 3a. The fuel films $G_2$ are then evaporated by heat of the compressed air within the combustion chamber 3 and by heat of the wall.

Accordingly, the fuel films $G_2$, part of the atomized fuel $F_2$, $F_3$, $F_4$ supplied in an atomized condition and atomized fuel $g_2$ of the remaining part of the atomized fuel $F_2$, $F_3$, $F_4$ further atomized by collision with the peripheral wall 3a are evaporated within the combustion chamber 3, and this gas is driven by the swirl flow $S_1$ and is thus dispersed and distributed uniformly within the combustion chamber 3. Consequently, air and the steam of fuel within the combustion chamber 3 are mixed with each other to produce a mixture layer $H_2$ which is transported toward the downstream of the swirl flows $S_1$ within the combustion chamber 3. In other words, a mixture of a uniform concentration is produced, dispersed and distributed within the combustion chamber 3.

It should be noted that during medium or high load running of the engine, the auxiliary nozzle hole 15 has been already opened and combustion is proceeding within the recessed portion, burnt gas produced within the recessed portion 4 and unburnt fuel flows into the combustion chamber 3. As a result, the mixture layer $H_2$ within the combustion chamber 3 is fired and burnt thereby.

Meanwhile, since upon such medium or high load running of the engine, the total amount of fuel injected from the main nozzle holes 17 is increased from the total amount of fuel injected upon low load running, the concentration of the mixture layer $H_2$ is determined to be a level sufficiently high for combustion.

Here, provision of the only one auxiliary nozzle hole 15 in the arrangement of the present embodiment is intended to assure a momentum relative to a swirl $S_1$ and to produce, in the spacing formed by the recessed portion 4, a rich mixture, that is, a rich mixture layer $H_1$, having a high flame propagation when it is fired by discharging by the spark plug means 19. The provision of the three main nozzle holes 17 is intended to assure a suitable momentum relative to a swirl $S_1$ and to cause atomized fuel injected therethrough to be dispersed and distributed uniformly within the main combustion chamber 3 to assure formation of a mixture layer $H_2$ and combustion without misfiring. Accordingly, combustion which is good in fuel cost performance and in output power performance can be attained.

A second embodiment of a combustion chamber arrangement for an internal combustion engine according to the invention will now be described with reference to FIG. 7 to 11.

Figure 7:
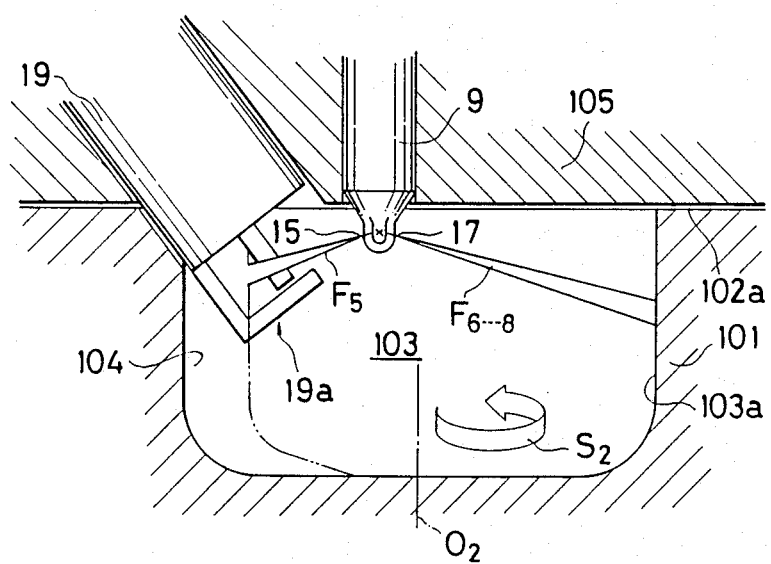
FIG. 7 is a partial vertical sectional view, shown schematically, of a combustion chamber arrangement of an internal combustion engine showing a second embodiment of the invention.
Figure 8:
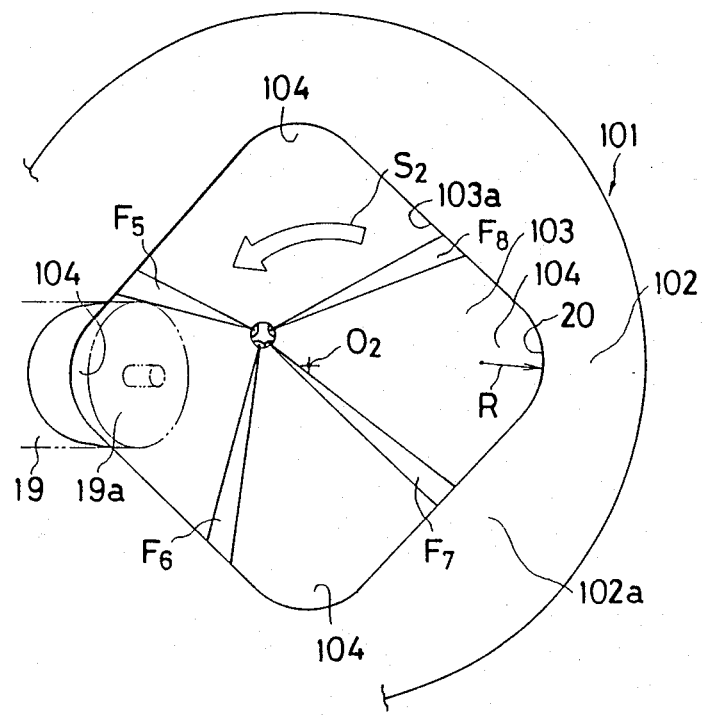
FIG. 8 is a diagrammatic plan view of the engine of FIG. 7.

Referring first to FIGS. 7 and 8, reference numeral 10 denotes a piston 102, a top portion of the piston 101, a combustion chamber 103 formed by deeply recessing the top portion 102 of the piston 101 downwardly in an axial direction form a reference plane provided by a top face 102a of the piston 101, and a cylinder head 105.

Similar to the combustion chamber 3 described hereinabove in conjunction with the first embodiment, the combustion chamber 103 is supplied with a turning flow of suction air from a swirl port (not shown). In the present embodiment, the combustion chamber 103 has a substantially regular square section transverse to the axis of the piston 101, and thus such a turning flow will make a swirl flow $S_2$ which turns around a center axis $O_2$ of the combustion chamber 103.

At corner portions of the combustion chamber 103 having the transverse section of a substantially regular square shape, straight sections of a peripheral wall 103a of the combustion chamber 103 are connected smoothly to each other by curved faces 20 having a radius R of curvature which is determined appropriately in accordance with the strength of the swirl flow $S_2$.

Accordingly, in the combustion chamber 103, the swirl flow $S_2$ is not readily admitted in such corner portions of the combustion chamber 103 having the square transverse section. This is because a swirl flow is rectified by repetitive collisions and reflections thereof with and by the peripheral wall 103a of the combustion chamber 103 and thus turns around the center axis $O_2$ of the combustion chamber 103. The corner portions thus form recessed portions 104 each corresponding to the recessed portion 4 described hereinabove in conjunction with the first embodiment. In the present embodiment, the combustion chamber 103 has four such recessed portions 104 formed therein.

It should be noted here that the embodiment presently being described employs the fuel injection nozzle means 9 (FIG. 3) and the spark plug means 19 both described hereinabove in conjunction with the first embodiment.

The spark plug means 19 is accommodated in and secured to a cylinder head 105 such that the discharging portion 19a thereof may be located in one of the four recessed portions 104 when the piston 101 is moved to a position near the top dead center thereof.

In particular, the spark plug means 19 is located such that when the piston 101 is moved to a position near the top dead center position thereof, the auxiliary nozzle hole 15 of the fuel injection nozzle means 19 faces that one of the straight sections of the peripheral wall 103a which is located on the upstream side of the discharging portion 19a of the spark plug means 19 in a direction of an adjacent swirl flow $S_2$ while the main nozzle holes 17 face the other straight sections of the peripheral wall 103a.

The operation of the second embodiment will now be described. Here, operation of the fuel injection nozzle means 9 when a load is applied is similar to that given in the description of the first embodiment above, and hence need not be repeated.

Figure 9:
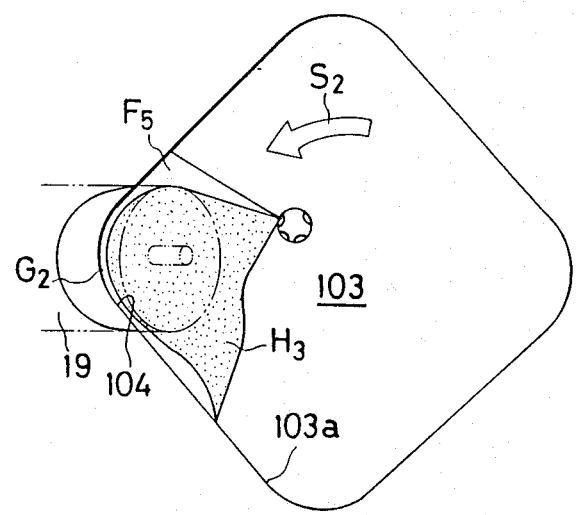
FIGS. 9, 10 and 11 are a plan view, a vertical sectional view and another plan view, respectively, diagrammatically illustrating burning conditions within the combustion chamber arrangement of FIG. 7.

As the auxiliary nozzle hole 15 is opened when the piston 101 is moved to a position near the top dead center thereof as shown in FIG. 9, atomized fuel is supplied to that one of the straight sections of the peripheral wall 103a located on the upstream side of the recessed portion 104 in which the spark plug means 19 is located in a direction of a swirl flow $S_2$. Atomized fuel $F_5$ supplied from the auxiliary nozzle hole 15 partially advances across the swirl flow $S_2$ within the combustion chamber 103 and collides with a curved portion of the peripheral wall 103a defining the recessed portion 104. The atomized fuel $F_5$ is further atomized by such collision and is thus scattered within the recessed portion 104.

Figure 12:
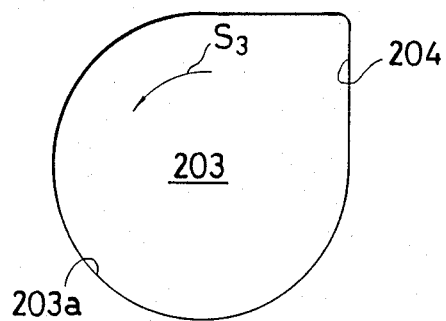
FIGS. 12 and 13 are plan views showing different embodiments of the invention.
Figure 13:
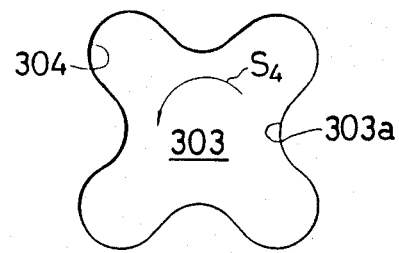
Figure 14:
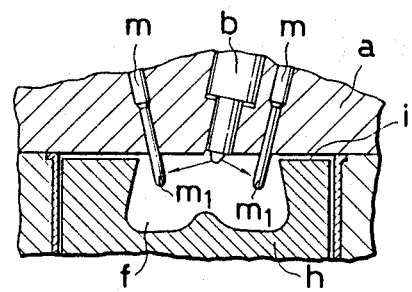
FIG. 14 is a partial vertical sectional view showing schematically a combustion chamber arrangement of a conventional internal combustion engine.
Figure 15:
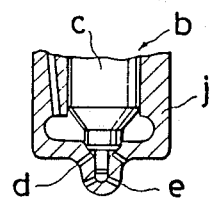
FIG. 15 is a partial vertical sectional view showing, in an enlarged scale, a fuel injection nozzle of the engine of the FIG. 14.

In the combustion chamber 103 having the substantially regular square transverse section, each of the recessed portions 104 thereof constitutes a spacing in which a swirl flow $S_2$ produced in the combustion chamber 10 is not readily admitted in order to produce a rich mixture therein, similar to the first embodiment. Accordingly, the shape of the transverse section of the combustion chamber is not limited only to a square. For example, a portion of the inner peripheral wall 103a of the combustion chamber 103 along a direction of the depth thereof may be recessed outwardly in a radial direction to form a recessed portion 204 as shown in FIG. 12. Or, the combustion chamber may have a transverse sectional shape providing petal-shaped recessed portions 304 relative to a swirl flow $S_4$. In the latter case, the recessed portions 304 are formed so as to communicate with a combustion chamber 303 relative to a peripheral wall 303a of the combustion chamber 303.

Further, the shape of the transverse section of the combustion chamber is not limited to a square or rectangular shape and may be a polygon such as a pentagon or a hexagon in which the spark plug means 19 and the fuel injection nozzle means 9 are located similarly as in the first or second embodiment.

Here, since a swirl flow $S_2$ is not readily admitted in the recessed portion 104 as seen from FIG. 9, the scattered atomized fuel $F_5$ is distributed within the recessed portion 104, heated and evaporated by heat of compressed air within the recess 104 and also by heat of the wall, and mixed with air. Meanwhile, the remaining part of the atomized fuel $F_5$ supplied into the recessed portion 104 comes to stick to the peripheral wall 103a defining the recessed portion 104 as a thin liquid film, that is, a fuel film $G_3$ which is gradually heated form outside and evaporated by heat of the compressed air and of the wall of the combustion chamber 103.

Accordingly, gas is produced from the fuel film $G_3$ and the scattered atomized fuel $F_5$ within the recessed portion 104 and is thus dispersed and distributed uniformly within the recessed portion 104.

Figure 10:
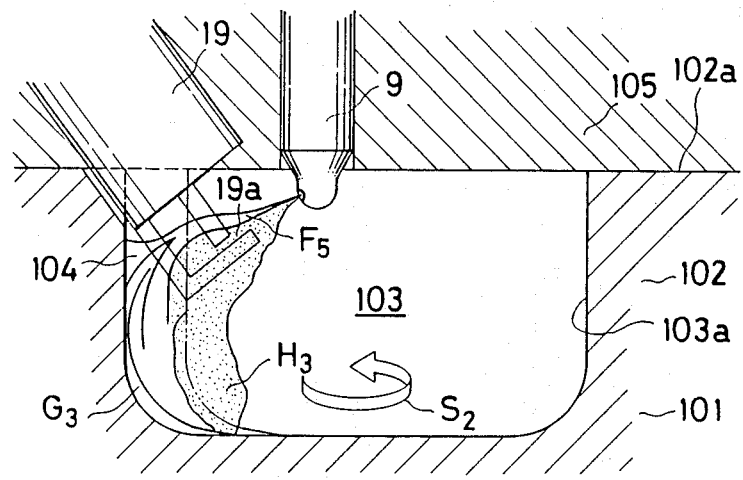

Accordingly, a mixture layer $H_3$ wherein the fuel gas is mixed with air is produced within the combustion chamber 103 as shown in FIG. 10. The mixture layer $H_3$ is prevented from flowing into the combustion chamber 103 due to the presence of the swirl flow $S_2$. Accordingly, where the fuel injected is gasoline or alcohol which has a low cetane number and a high volatility, the concentration of mixture within the recessed portion 104 can be raised.

Consequently, if discharging is effected at the discharging portion 19a of the spark plug means 19 when such a rich mixture layer $H_3$ is produced, the mixture layer $H_3$ is fired rapidly and thus burnt.

Figure 11:
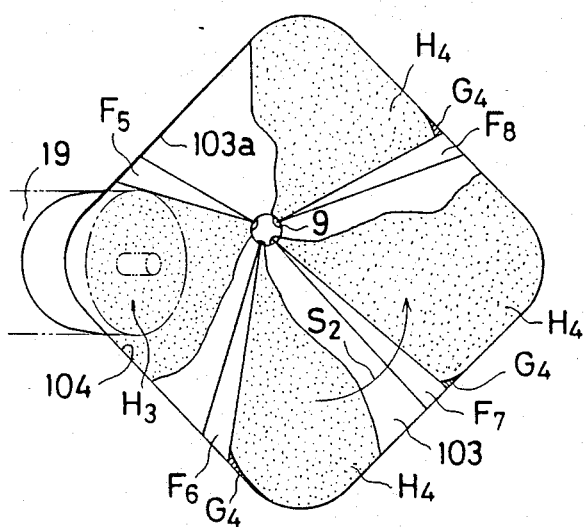

Meanwhile, during medium or high load running of the engine, the needle valve 311 of the fuel injection nozzle means 9 shown in FIG. 3 is lifted to a level higher than the predetermined lift value. Consequently, the plurality of main nozzle holes 17 are opened in addition to the auxiliary nozzle hole 15. Accordingly, atomized fuel is supplied from the main nozzle holes 17 toward portions of the peripheral wall 103a of the combustion chamber 103 opposing the main nozzle holes 17, as shown in FIG. 11. Atomized fuel $F_6$, $F_7$, $F_8$ thus spouted from the main nozzle holes 17 advances across a swirl flow $S_2$ so that it is partially heated and evaporated by heat of compressed air. Meanwhile, the remaining parts of the atomized fuel $F_6$, $F_7$, $F_8$ spouted from the main nozzle holes 17 have a sufficient momentum to allow them to advance across the swirl flow $S_2$ to reach the peripheral wall 103a. Accordingly, the remaining parts of the atomized fuel $F_6$, $F_7$, $F_8$ collide with and are partially atomized further by the opposing peripheral wall 103a. Such further atomized parts of the atomized fuel $F_6$, $F_7$, $D_8$ are then evaporated by heat of compressed air and of the wall and are dispersed and distributed within the combustion chamber 103. On the other hand, the remaining parts of the atomized fuel $F_6$, $F_7$, $F_8$ become stuck to respective portions of the peripheral wall 103a opposing to the main nozzle holes 17 due to collision with the peripheral wall 103a. Consequently, a thin fuel film is formed on each of the portions of the peripheral wall 103a. The fuel films are then evaporated by heat of the compressed air within the combustion chamber 103 and by heat of the wall.

Accordingly, the fuel films $G_4$, part of the atomized fuel $F_6$, $F_7$, $F_8$ supplied in an atomized condition and the remaining part of the atomized fuel $F_6$, $F_7$, $F_8$ supplied in an atomized condition and the remaining part of the atomized fuel $F_6$, $F_7$, $F_8$ further atomized by collision with the peripheral wall 103a are evaporated within the combustion chamber 103, and the gas of the fuel is driven by the swirl flow $S_2$. Accordingly, the gas of the fuel and air within the combustion chamber 103 are mixed with each other. Consequently, a mixture layer $H_4$ is produced within the combustion chamber 103 and is propelled downstream of the swirl flow $S_2$. In other words, mixture of a uniform concentration is produced within the combustion chamber 103.

Incidentally, since during medium or high load running of the engine, the auxiliary nozzle hole 15 has been already opened and combustion is proceeding within the recessed portion, burnt gas produced within the recessed portion 104 and unburnt fuel flow into the combustion chamber 103. As a result, the mixture layer $H_4$ within the combustion chamber 103 is fired and burnt thereby.

Meanwhile, since, upon medium or high load running of the engine, the total amount of fuel injected from the main nozzle holes 17 is increased from the total amount of fuel injected upon low load running, the concentration of the mixture layer $H_2$ is determined to be a level sufficient for combustion. Thus, superior combustion performance is also attained by the second embodiment described above.

What is claimed is:

1. A combustion chamber arrangement for an internal combustion engine employing fuel having high volatility and a low centane number, comprising a piston having a combustion chamber therein and defined by a primary recess in a top portion thereof extending along an axial direction, said piston further having a semispherically recessed portion defined by a secondary recess in a portion of a peripheral wall of said combustion chamber in a direction along the depth of said piston in a radially outward direction, fuel injection nozzle means for only supplying said fuel into said secondary recess under light engine load conditions and for supplying said fuel into both said primary and secondary recesses under heavy engine load conditions, said fuel injection nozzle means being located close to said secondary recess, and spark plug means located within said secondary recess for promoting firing of the supplied fuel.

2. A combustion chamber arrangement for an internal combustion engine according to claim 1, wherein said secondary recess has a smaller capacity than said primary recess and is arranged to prevent a swirl flow turning within said combustion chamber from being admitted therein.

3. A combustion chamber arrangement for an internal combustion engine according to claim 1, wherein said fuel injection nozzle means has formed therein an auxiliary nozzle hole having an auxiliary nozzle area and a main nozzle hole having a nozzle area greater than said auxiliary nozzle area, said auxiliary nozzle hole being opened prior to the opening of said main nozzle hole.

4. A combustion chamber arrangement for an internal combustion engine according to claim 1, wherein said fuel injection nozzle means has an auxiliary nozzle hole and a main nozzle hole formed therein, said auxiliary nozzle hole being directed so as to atomize and supply said fuel into said recessed portion while said main nozzle hole is directed so as to atomize and supply fuel into said combustion chamber.

5. A combustion chamber arrangement for an internal combustion engine according to claim 1, wherein said fuel injection nozzle means is received in and secured to a cylinder head of said engine.

6. A combustion chamber arrangement for an internal combustion engine according to claim 1, wherein said combustion chamber of said piston has a circular transverse section, and said recessed portion is formed by recessing a portion of the peripheral wall of said combustion chamber in a direction along the depth of said piston in a radially outward direction.

7. A combustion chamber arrangement for an internal combustion engine according to claim 1, wherein said piston has a plurality of recessed portions formed in circumferentially spaced relationship relative to each other by recessing portions of said peripheral wall of said combustion chamber in a direction along the depth of said piston, said spark plug means being located in at least one of said plurality of recessed portions, said fuel injection nozzle means being located so as to atomize and supply said fuel into said combustion chamber and into one of said recessed portions in which said spark plug means is located.

8. A combustion chamber arrangement for an internal combustion engine according to claim 7, wherein said spark plug means is received in and secured to a cylinder head of said engine.

9. A combustion chamber arrangement for an internal combustion engine according to claim 1, wherein said combustion chamber has a polygonal section transverse to the axial direction of said piston, said recessed portion being provided by each of the corner portions of the polygon.

10. A combustion chamber arrangement for an internal combustion engine according to claim 9, wherein the transverse section of said combustion chamber has a square shape.

11. A combustion chamber arrangement for an internal combustion engine according to claim 9, wherein the transverse section of said combustion chamber has a pentagonal shape.

12. A combustion chamber arrangement for an internal combustion engine according to claim 9, wherein the transverse section of said combustion chamber has a hexagonal shape.

* * * * *